May 23, 1939.  A. MARTY  2,159,441
ANIMAL RESTRAINER
Filed Oct. 20, 1937   2 Sheets-Sheet 1
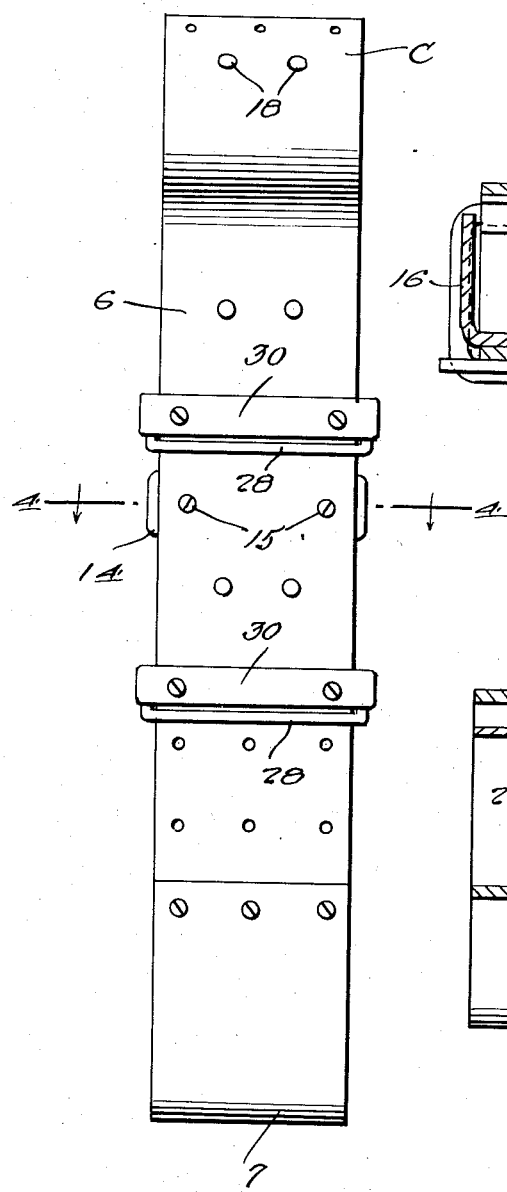
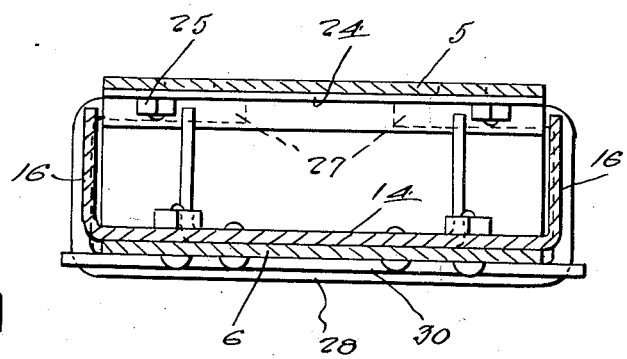
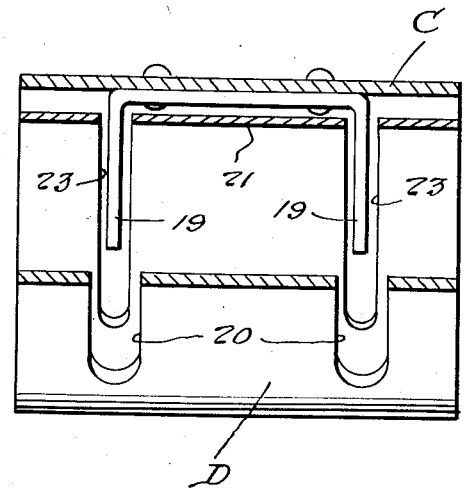
Inventor
Adam Marty
By Clarence A. O'Brien
Hyman Berman
Attorneys

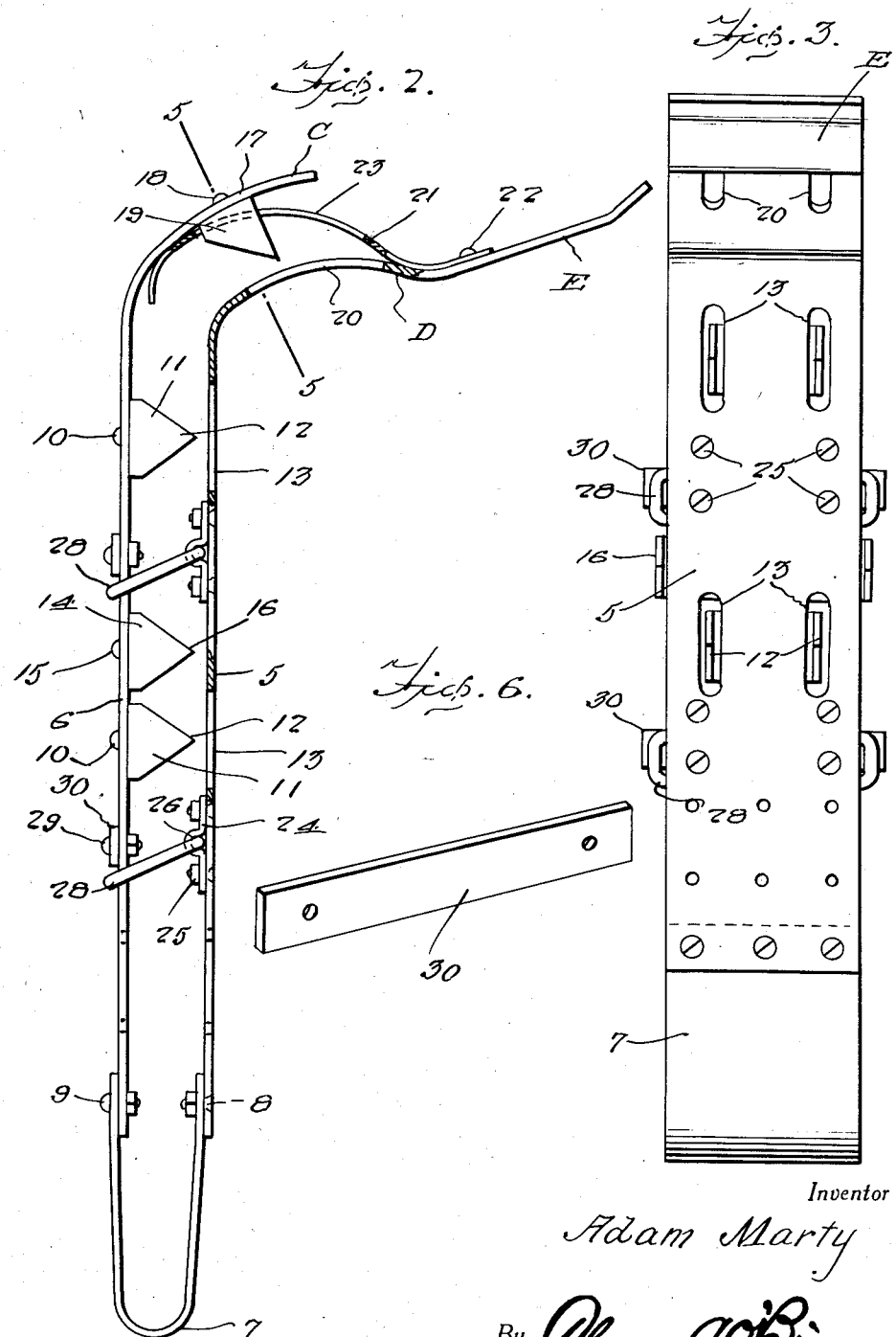

Patented May 23, 1939

2,159,441

UNITED STATES PATENT OFFICE 2,159,441

ANIMAL RESTRAINER

Adam Marty, Monroe, Wis.

Application October 20, 1937, Serial No. 170,090

1 Claim. (Cl. 119—142)

This invention relates to means for restraining stock in their efforts to get through fences and other barriers.

The invention has particular reference to an animal restraining device of the character adapted for cattle and which is mounted on the head of the stock in a manner to function in frustrating efforts of the animal to get through fences or analogous barriers.

Further in accordance with the present invention the animal restraining device is so provided as to serve as a means for protection to human life, since in actual practice the same will be found as an effective means for preventing butting of a human being on the part of the animal.

The animal restrainer embodying the features of the present invention involves certain new and useful improvements over other known or patented restrainers of a similar character, and as will be best understood from a study of the following description taken in connection with the accompanying drawings wherein:—

Figure 1 is a front elevational view of the restraining device.

Figure 2 is a side elevational view thereof with parts shown in section.

Figure 3 is a rear elevational view of the restraining device.

Figure 4 is a transverse sectional view taken substantially on the line 4—4 of Figure 1.

Figure 5 is a detail sectional view taken substantially on the line 5—5 of Figure 2, and Figure 6 is a perspective view of a keeper bar forming part of the invention.

Referring to the drawings more specifically it will be seen that the device comprises a back section 5, a front section 6, and a bottom section 7. The section 7 is formed of spring metal and is bent into substantial U form and is adjustably connected with the back section 5 and the front section 6 at the lower end of said back and front sections, each of said front and back sections at the lower portion thereof being provided as clearly shown with vertical series of relatively spaced pairs of openings through the medium of which and bolts 9 one leg of the member 7 is adjustably secured to the section 6 and through the medium of bolts 8 the other leg of the section 7 is adjustably secured to the section 5 of the restraining device. Due to the inherent resiliency thereof member 7 exerts a yielding pressure on the back section 5 and front section 6 for yieldably spreading these sections apart.

Secured to the inner side of the front section 6 through the medium of rivets or other suitable fastening elements 10 are upper and lower U-shaped members 11, the leg portions of which, as shown, are sharpened to provide pointed prongs 12 which are disposable through slots 13 arranged in pairs in the back section 5. Thus it will be seen that when the front section 6 is urged toward the back section 5, as when the restraining device comes in contact with a fence or analogous obstacle, prongs 12 will pass through the slots 13 and thereby prick the animal.

Also secured to the front member 6 and spaced upwardly a slight distance from the member 11 is a U-shaped member 14 secured to the member 6 through the medium of rivets 15. The U-shaped member 14 has the sides thereof disposed laterally of the members 5 and 6 and sharpened to provide prongs 16 which, when the member 6 is moved rearwardly toward the member or section 5, will clear the side edges of the section 5 and prick the animal.

An additional animal pricking device in the form of a U-shaped member 17 is riveted or otherwise secured as at 18 at the inner side of the rearwardly curved upper end portion C of the front section 6; and the member 17 has its leg portions sharpened to provide prongs 19 which are disposable through slots 20 in the rearwardly curved portion D of the rear section 5.

A strip spring 21 is anchored at one end thereof to the rearwardly projecting portion D of section 5 as at 22 and has an arcuate free end portion that is disposed under the curved portion C of the section 6 so as to resist downward movement of the portion C of the said section 6. Spring 21 is provided with slots 23 substantially registering with the slots 20 to accommodate the prongs 19 of member 17.

The portion D of the rear section 5 merges into an attaching extension E, and the attaching extension E is adapted to be riveted to suitable straps or other devices for securing the restraining device to the head of the animal.

A salient feature of the present invention is in the provision of means for limiting the outward movement of the section 6 relative to the section 5, which member 6 has a tendency to do in response to the action of the U-shaped spring member 7. Thus, and as clearly shown in the drawings, there are secured to the inner side of the rear section 5 vertically spaced hinge plates 24 bolted or otherwise secured to the section 5 as at 25.

Each of the plates 24 at its longitudinal median is pressed out to provide an internal groove 26 which receives the pintles 27 of a bail-like keeper element 28.

The keeper elements 28 straddle or embrace the front section 6 in a manner shown, and for each keeper element 28 there is bolted or otherwise secured to the front section 6 as at 29 a transverse stop or keeper bar 30. The keeper bars 30 are arranged above the bails 28 as clearly shown in Figure 6 and serve to limit the upward movement of the bales 28 relative to the front section 6 as the latter, in response to the action of spring 7 tend to move forwardly or away from the rear section 5 of the restraining device.

It is thought that a clear understanding of the construction, utility and advantages of an animal restraining device embodying the features of the present invention will be had without a more detailed description.

Having thus described my invention, what is claimed as new is:

A restraining device of the character described comprising spaced parallel front and rear sections, a substantially U-shaped bottom section of spring material connecting said front and rear sections at the lower ends of the latter and tending to spread said sections apart, spring means between the upper ends of the front and rear sections and tending to force the sections apart rearwardly extending prong members on said front section, and said rear section being provided with slots through which said prong members project when the front section is urged toward the rear section of the device, bail members embracing said front section and hinged to said rear section in a manner to limit movement of the front section in a direction away from said rear section and stop members on the front face of the front section for limiting upward movement of the bail members.

ADAM MARTY.